(12) United States Patent
Russell et al.

(10) Patent No.: US 7,327,832 B1
(45) Date of Patent: Feb. 5, 2008

(54) ADJUNCT PROCESSING OF MULTI-MEDIA FUNCTIONS IN A MESSAGING SYSTEM

(75) Inventors: Gary P. Russell, King of Prussia, PA (US); Robert T. Miller, Dresher, PA (US); Reginald V. Blue, Potomac Falls, VA (US)

(73) Assignee: Unisys Corporation, Blue Bell, PA (US)

( * ) Notice: Subject to any disclaimer, the term of this patent is extended or adjusted under 35 U.S.C. 154(b) by 68 days.

(21) Appl. No.: 09/636,677

(22) Filed: Aug. 11, 2000

(51) Int. Cl.
H04M 11/06 (2006.01)

(52) U.S. Cl. .................. 379/88.14; 370/363; 704/260; 709/250

(58) Field of Classification Search ............ 379/88.01, 379/67.1, 88.12, 309, 88.13, 88.14, 88.17, 379/88.18, 88.25, 88.16; 370/352, 375, 389; 381/91; 704/260; 713/200; 358/402; 380/257; 709/250

See application file for complete search history.

(56) References Cited

U.S. PATENT DOCUMENTS

| | | | |
|---|---|---|---|
| 4,688,212 A | 8/1987 | MacGinitie et al. .......... 370/85 |
| 5,029,199 A | 7/1991 | Jones et al. .................... 379/89 |
| 5,133,004 A | 7/1992 | Heileman, Jr. et al. ....... 379/67 |
| 5,138,710 A | 8/1992 | Kruesi et al. ................. 395/575 |
| 5,301,226 A | 4/1994 | Olson et al. ................... 379/67 |
| 5,323,450 A | 6/1994 | Goldhagen et al. ......... 379/100 |
| 5,384,829 A | 1/1995 | Heileman, Jr. et al. ....... 379/67 |
| 5,394,460 A | 2/1995 | Olson et al. ................... 379/67 |
| 5,513,314 A | 4/1996 | Kandasamy et al. ... 395/182.04 |
| 5,557,668 A | 9/1996 | Brady ........................ 379/212 |
| 5,572,709 A | 11/1996 | Fowler et al. .............. 395/500 |
| 5,592,611 A | 1/1997 | Midgely et al. ....... 395/182.02 |
| 5,608,865 A | 3/1997 | Midgely et al. ............ 395/180 |
| 5,613,108 A | 3/1997 | Morikawa ................... 393/616 |
| 5,623,538 A | 4/1997 | Petty ............................ 379/67 |
| 5,633,999 A | 5/1997 | Clowes et al. ......... 395/182.04 |
| 5,659,599 A | 8/1997 | Arumainayagam et al. ... 379/89 |
| 5,675,723 A | 10/1997 | Ekrot et al. ............ 395/182.02 |
| 5,678,042 A | 10/1997 | Pisello et al. ............... 395/610 |
| 5,680,551 A | 10/1997 | Martino, II ............ 395/200.15 |
| 5,689,706 A | 11/1997 | Rao et al. .................... 395/617 |
| 5,696,895 A | 12/1997 | Hemphill et al. ...... 395/182.02 |
| 5,724,347 A | 3/1998 | Bell et al. .................... 370/377 |
| 5,724,418 A | 3/1998 | Brady ........................ 379/212 |
| 5,732,214 A | 3/1998 | Subrahmanyam ...... 395/200.12 |

(Continued)

FOREIGN PATENT DOCUMENTS

EP 0 567 294 A2 10/1993

(Continued)

*Primary Examiner*—Gerald Gauthier
(74) *Attorney, Agent, or Firm*—Richard J. Gregson; Woodcock Washburn LLP (57) ABSTRACT

A system and methods to allow messaging systems to efficiently perform multi-media processing functions are provided. An exemplary messaging system comprises a host computer interconnected to a network interface unit (NIU), that is, itself, interconnected to external telephone networks. An embedded services platform (ESP) within the NIU provides a general-purpose computing capability within the ESP and provides a network interface for connecting the ESP to an external network. A media resource server (MRS) connected to the external network is used to offload multi-media processing function from the host computer to the MRS via the ESP.

24 Claims, 5 Drawing Sheets

U.S. PATENT DOCUMENTS

| | | | |
|---|---|---|---|
| 5,740,231 A | 4/1998 | Cohn et al. | 379/89 |
| 5,959,988 A * | 9/1999 | Bjorkman et al. | 370/389 |
| 6,078,733 A * | 6/2000 | Osborne | 709/250 |
| 6,115,455 A * | 9/2000 | Picard | 379/67.1 |
| 6,141,341 A * | 10/2000 | Jones et al. | 370/352 |
| 6,188,983 B1 * | 2/2001 | Hanson | 704/260 |
| 6,202,155 B1 * | 3/2001 | Tushie et al. | 713/200 |
| 6,219,645 B1 * | 4/2001 | Byers | 381/91 |
| 6,229,881 B1 * | 5/2001 | Alonso et al. | 379/88.01 |
| 6,233,315 B1 * | 5/2001 | Reformato et al. | 379/88.01 |
| 6,233,318 B1 * | 5/2001 | Picard et al. | 379/88.17 |
| 6,246,983 B1 * | 6/2001 | Zou et al. | 704/260 |
| 6,396,907 B1 * | 5/2002 | Didcock | 379/88.17 |
| 6,741,705 B1 * | 5/2004 | Nelson et al. | 380/257 |

FOREIGN PATENT DOCUMENTS

| | | |
|---|---|---|
| EP | 0 760 573 A3 | 3/1997 |
| WO | WO 97/12469 | 4/1997 |

* cited by examiner

ADJUNCT PROCESSING OF MULTI-MEDIA FUNCTIONS IN A MESSAGING SYSTEM

FIELD OF THE INVENTION

The present invention relates generally to media processing in messaging systems and, more particularly, to extending processing abilities of messaging systems to efficiently perform a variety of multi-media processing functions.

BACKGROUND OF THE INVENTION

Messaging systems that provide voice and fax messaging capabilities are well known. One example of such a messaging system is the Network Applications Platform (NAP) commercially available from UNISYS Corporation ("the NAP system"). The NAP is a configuration of hardware and software that provides data and voice processing capabilities through applications running on a host computer system. The NAP, in combination with a network interface unit (NIU), provides the interface between these applications, called network applications, and a telephone network. The NAP is implemented on selected Unisys A Series and ClearPath HMP NX computer systems running the Unisys MCP operating system. Further details of the structure and function of the NAP are provided in the following issued patents and pending applications, all of which are hereby incorporated by reference in their entireties:

U.S. Pat. No. 5,133,004, issued Jul. 21, 1992, entitled "Digital Computer Platform for Supporting Telephone Network Applications";

U.S. Pat. No. 5,323,450, issued Jun. 21, 1994, entitled "Telephone Network Applications Platform for Supporting Facsimile Applications";

U.S. Pat. No. 5,384,829, issued Jan. 24, 1995, entitled "Digital Computer Platform for Supporting Telephone Network Applications";

U.S. Pat. No. 5,493,606, issued Feb. 20, 1996, entitled "Multi-Lingual Prompt Management System for a Network Applications Platform";

U.S. Pat. No. 6,058,166, issued May 2, 2000, entitled "Enhanced Multi-Lingual Prompt Management in a Voice Messaging System With Support for Speech Recognition";

U.S. patent application Ser. No. 09/161,214, filed Sep. 25, 1998, entitled "Multiple Node Messaging System Wherein Nodes Have Shared Access To Message Stores Of Other Nodes";

U.S. patent application Ser. No. 09/307,014, filed May 7, 1999, entitled "Inter-System Call Transfer"; and U.S. patent application Ser. No. 09/451,077, filed Nov. 30, 1999, entitled "Method and Apparatus for Preventing Hung Calls During Protocol Violations in a Voice Messaging System".

Network applications running on the NAP 20 can provide enhanced services for telephone networks, such as Call Answer, Call Forward, Voice Store and Forward, Voice Mail, Bank By Phone, Emergency Number Facilities, Directory Assistance, Operator Assistance, Call Screening, Automatic Wake-up Services, and the like.

So-called "Universal Messaging" systems are an attempt to combine traditional voice and fax messaging capabilities with electronic mail ("e-mail") capabilities. One approach to providing universal messaging system functionality is to, in effect, integrate an existing voice messaging system, such as the Unisys NAP, with an existing e-mail system. Each platform retains its own message store, but the system integrates those stores so that a subscriber can access all of the subscriber's voice, fax and e-mail messages from a single interface. Universal messaging systems typically provide access to messages from either a Web client, such as a Web browser, or a traditional telephone handset.

With the advent of multi-media processing, both traditional voice and fax messaging systems, such as the Unisys NAP, and universal messaging systems that combine voice, fax, and e-mail messaging capabilities, are likely to experience a need for a variety of multi-media processing capabilities, such as text-to-speech conversion (so that an e-mail message can be "played" over a telephone handset in a universal messaging system) and speech recognition (to enable voice commands to be interpreted or to enable voice messages to be converted to text). Also, both traditional messaging systems and newer universal messaging systems may in the future incorporate natural language understanding capabilities, which again requires specialized processing.

Unfortunately, traditional voice and fax messaging systems, whether integrated with other messaging platforms in a universal messaging solution or not, are limited in the amount and type of multi-media processing they can perform. These systems are not currently capable of handling the large volumes of multi-media processing that today's messaging services may require. Consequently, there is a need for improved systems and methods for efficiently performing various kinds of multi-media processing, such as text-to-speech (TTS), automated speech recognition (ASR), and natural language understanding (NLU) in a messaging system. The present invention satisfies this need.

SUMMARY OF THE INVENTION

The present invention is directed to systems and methods that enable existing messaging systems to efficiently perform multi-media processing. The present invention is particularly useful in an integrated universal messaging system in order to provide an improved method for performing a variety of multi-media processing functions in such a system, including, for example, text-to-speech processing, automated speech recognition processing, and natural language understanding processing.

A messaging system in accordance with the present invention comprises (i) a voice messaging platform for receiving, processing, and storing messages; (ii) at least one network interface unit (NIU) having a first interface to the voice messaging platform for communicating between the NIU and the voice messaging platform and a second interface to a telephone network for receiving calls from the telephone network; (iii) at least one embedded services platform (ESP) operatively coupled to the first and second interfaces of the NIU, the ESP comprising a processor, a memory, and an operating system executing on the processor for executing software applications that are otherwise incapable of executing within the NIU, the ESP further comprising a network interface for communicating between the ESP and a network external to the messaging system; and (iv) at least one media resource server connected to the ESP via the network interface of the ESP, the ESP offloading selected multi-media processing functions to the media resource server. This eliminates the need for such processing functions to be performed by the voice messaging platform and thus results in improved efficiency.

A universal messaging system in accordance with the present invention comprises (i) a voice messaging platform for receiving, processing, and storing voice messages; (ii) an e-mail messaging platform interfaced to the voice messaging platform for receiving, processing, and storing e-mail messages; (iii) at least one network interface unit (NIU) having a first interface to the voice messaging platform for communicating between the NIU and the voice messaging platform and a second interface to a telephone network for receiving calls from the telephone network; (iv) at least one embedded services platform (ESP) operatively coupled to the first and second interfaces of the NIU, the ESP comprising a processor, a memory, and an operating system executing on the processor for executing software applications that are otherwise incapable of executing within the NIU, the ESP further comprising a network interface for communicating between the ESP and a network external to the messaging system; and (iv) at least one media resource server connected to the ESP via the network interface of the ESP, the ESP offloading selected multi-media processing functions to the media resource server.

Additional features and advantages of the present invention will become evident hereinafter.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings.

DETAILED DESCRIPTION OF PREFERRED EMBODIMENTS

As used herein and in the claims, the following terms and phrases have the following meanings:

"Voice messaging platform" means a combination of hardware and/or software that provides voice messaging capability. The voice messaging platform interfaces to a telephone network, such as the Public Switched Telephone Network (PSTN), to enable subscribers to establish a call to the voice messaging platform from a telephone handset connected to the telephone network.

"E-mail messaging platform" means a combination of hardware and/or software that provides electronic mail messaging capabilities.

"Telephony session" means the time from when a call is received on a voice messaging platform to the time the call is terminated by the caller.

"E-mail session" means the collection of interactions with an e-mail messaging platform that occur during and that correspond to a particular telephony session.

"Call flow" means any program, procedure, script, state machine, or other series of instructions that define how a call is processed on a voice messaging platform during a telephony session.

Figure 1:
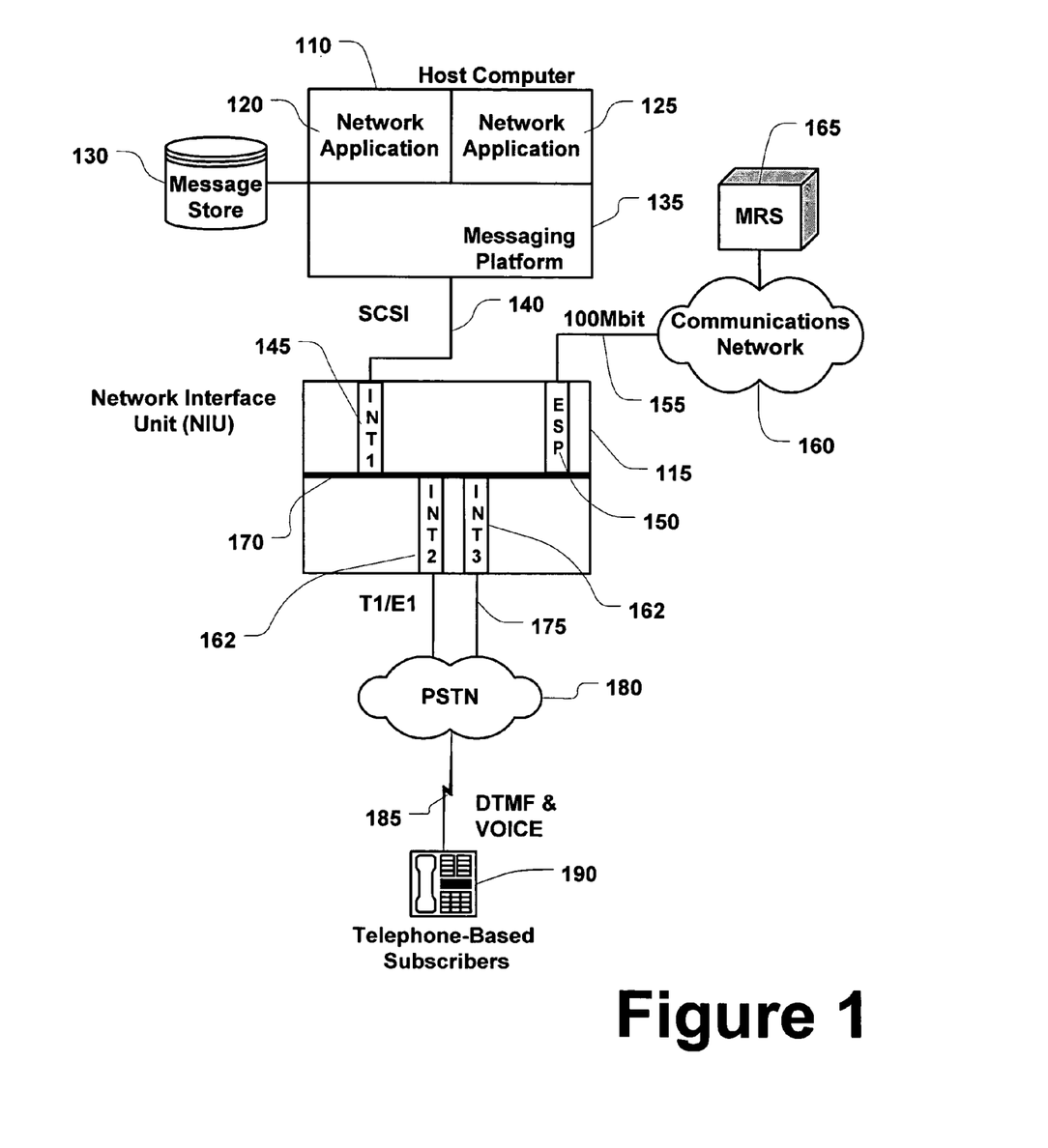
FIG. 1 is a block diagram of an exemplary messaging system in accordance with an embodiment of the present invention.

Referring now to the drawings wherein like numerals indicate like elements throughout, there is shown in FIG. 1 a block diagram of an exemplary messaging system 100 in accordance with one embodiment of the present invention. Messaging system 100 comprises host computer 110 electronically coupled to network interface unit (NIU) 115. In turn, NIU 115 is electronically coupled to public switched telephone network (PSTN) 180 that supports telephone-based subscribers 190. As shown, host computer 110 comprises a messaging platform 135 that executes network applications 120 and 125, respectively. In addition, messaging platform may allow network applications 120 and 125 to cooperate with message store 130. Message store 130 may be used by messaging system 100 to store data for telephone-based subscribers 190. In the preferred embodiment, messaging platform 135 comprises the aforementioned Network Applications Platform (NAP) commercially available from Unisys Corporation, and the host computer 110 on which the NAP runs comprises a selected Unisys A Series or ClearPath HMP NX computer system.

The NIU 115 contains a series of interfaces, interface 1 (INT1), interface 2 (INT2), and interface 3 (INT3). One interface, such as INT1, interfaces the NTU 115 to the messaging platform 135 on the host computer 110. Communication between INT1 and messaging platform 115 is via a Small Computer Systems Interface (SCSI) bus 140. Others of the interfaces, such as INT2 and INT3 (of which there can be many), interface NIU 115 to PSTN 180. Preferably, interfaces such as INT1, INT2, and INT3 are implemented on printed circuit boards housed within the NIU that can communicate with each other via a common bus 170. In a preferred embodiment, bus 170 implements the Multibus II (IEEE 1296) open bus standard.

According to the present invention, the NTU further comprises an embedded services platform (ESP) 150. In the preferred embodiment, the ESP 150 comprises a single board computer having its own processor, memory, and operating system executing on the processor, which together provide a general purpose computing capability within the NIU 115 for executing software applications that are otherwise incapable of executing within the NIU. Additionally, the ESP 150 further comprises a network interface for connection of the NIU 115 to other communications networks external to the messaging system, such as communications network 160. In the preferred embodiment, the NIU 115 comprises a modified Telephony Services Processor (TSP) commercially available from Unisys Corporation. Additional details concerning this NIU implementation are provided in co-pending, commonly assigned, patent application Ser. No. 09/636,656, filed herewith, entitled "Network Interface Unit Having an Embedded Services Processor", which is hereby incorporated by reference in its entirety.

As described more fully in the co-pending application, interfaces INT2, INT3 are each implemented in the TSP by a Primary Rate Interface Module (PRIM), of which there can be many in any given TSP. Interface INT1 is implemented by a PDP Card. Each PRIM interfaces a set of (e.g., 24 or 32) telephone circuits to the PDP card. In addition, one PRIM can be dedicated to signaling. The ESP 150 preferably comprises an EWSIII SBCP5200 single board computer commercially available from RadiSys Corporation. This board includes an Intel Pentium processor and executes the Microsoft Windows NT 4.0 operating system. A pair of 10/100 BaseT Ethernet controllers provide the network interface for connecting to and communicating across communications network 160. This enables the ESP 150 to support connection to 100 Megabit Ethernet communications networks. The ESP 150 connects to the bus 170 within the NIU 115, enabling it to communicate with the other interface boards INT1, INT2, INT3, etc. within the NIU 115. Thus, the ESP 150 provides a general purpose computing capability within NIU 115, and more particularly, provides such capability at the point in the architecture of messaging system 100 where the messaging platform 135 interfaces to the telephone network 180.

Further according to the present invention, a media resource server MRS 165 is connected to the messaging system via communication network 160 and the network interface of the ESP 150 of the NIU 115. Software executing on the host computer 110, the ESP 150, and the MRS 165, enables the ESP 150 to offload selected multi-media processing functions to the MRS 165, thereby eliminating the need for such processing functions to be performed by the voice messaging platform. For example, in the present embodiment, the ESP 150 is capable of offloading multi-media functions including but not limited to Text-to-Speech (TTS) conversion, Automatic Speech Recognition (ASR), and Natural Language Understanding (NLU). Any number of MRS units 165 may be attached to an ESP 150 up to the throughput capacity of the network connection 160. Further, multiple ESP's 150 (not shown) may reside in the NIU 115 to further expand the multi-media processing capacity of the present invention or to provide redundancy.

Figure 2:
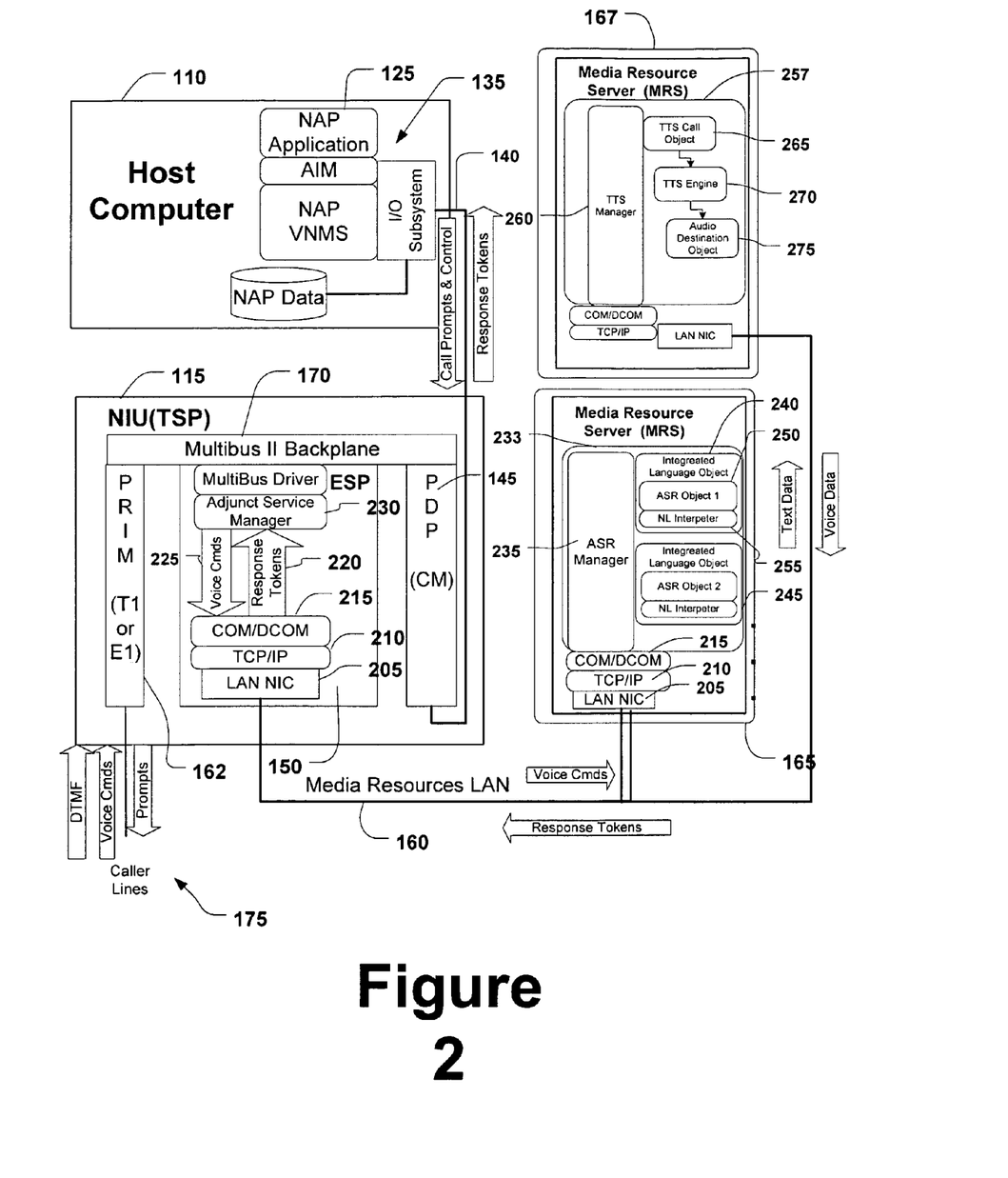
FIG. 2 is block diagram of the software components employed by the messaging system of FIG. 1 in accordance with the present invention.

FIG. 2 is a block diagram illustrating one exemplary software architecture for offloading a multi-media processing function to the MRS 165 and MRS 167 of the messaging system 100 of FIG. 1. In this example, an automated speech recognition function is being offloaded to the MRS 165. Also in this example, the messaging platform 135 comprises the Unisys NAP. Two subcomponents of the NAP architecture are shown, a voice network management system component (VNMS) and an application interface module component (AIM). The VNMS component is the host-based software of the NAP that routes incoming calls to the appropriate applications (e.g., application 125), routes outgoing calls to the appropriate ports, manages the recording and transmission of voice messages, and tracks information about each call. The AIM component provides the interface between the VNMS and the network application 125. The AIM translates high-level application commands from the application 125 to functions specific to the VNMS. The AIM reports results of command execution by the VNMS back to the application by way of a response. Commands and responses issued by the AIM carry with them unique dialog IDs assigned by the AIM that associate them with a particular subscriber telephony session on the platform (i.e., a particular call received from a subscriber via the telephone network).

Software on the ESP 150 of the TSP 115 may comprise a Multibus driver that allows communication between the ESP 150 and the PRIM 162 and PDP 145 interfaces of the TSP 115, an Adjunct Services Manager (ASM) that cooperates with the Multibus driver and an external communications stack comprised of a COM/DCOM layer and a TCP/IP protocol layer communication stack. The communications stack (COM/DCOM and TCP/IP) handles communications between the ASM 230 of the ESP 150 and cooperating components on the MRS 165 via the network 160 using instructions 225 and response tokens 220.

In the present embodiment, the MRS 165 is an Intel-based server running the Microsoft Windows NT operating system. As shown in FIG. 2, the MRS 165 has a corresponding communication stack (COM/DCOM and TCP/IP) similar to that found in the NIU 115 for communicating with the ESP 150 via the network 160. Communication stack comprises a LAN Network Interface Card (NIC) 205 supporting TCP/IP stack 210 and COM/DCOM libraries 215. In addition, the ASR functionality of the MRS 165 is implemented by Automatic Speech Recognition (ASR) Resources 233 having ASR Manager 235 and one or more Integrated Language Objects 240 and 245, each of which further comprises an ASR Object 250 and an NL Interpreter 255. Each ASR Object 250 represents a particular speech recognizer from a particular vendor for a particular language. One example of a suitable ASR engine that can be used in the present embodiment is the ASR 1500 available from Lernout & Hauspie, Burlington, Mass. Thus, in a multi-language application, there may be a number of ASR Objects on the MRS 165. This architecture allows different speech recognizers from different vendors to be used, as desired, without having to change the underlying software architecture of the MRS 165 and ESP 150. The functions and operations of the NL Interpreter are better described in U.S. Pat. No. 6,094,635, entitled "System and Method For Speech Enabled Application", which is hereby incorporated by reference in its entirety.

The ASR Manager 235 on the MRS 165 is responsible for managing all interactions between the ASM 235 on the ESP 150 and any of the ASR Objects (e.g. 250). When multiple MRS servers (e.g. 165 and 167) are attached to the network 160, the ASM 230 of the ESP 150 may choose the least busy ASR Manager 235 among all of the cooperating MRS servers (e.g. 165 and 167) to process a given request for speech recognition processing. The ASM 235 then routes recognition parameters, audio data, and recognition results to and from the ASR Manager 235 selected to handle the particular request. In turn, the ASR Manager 235 selects the appropriate ASR Object (speech recognizer) 250 to process the request.

In greater detail, at system startup, the ASR Manager 235 on the MRS 165 automatically initializes as a Microsoft Windows NT COM service. After initialization, the ASR Manager creates the array of Integrated Language Objects (ILOs) 240—the number of these objects may be specified in the initialization. As mentioned, each ILO 240 may contain one instance of speech recognizer (in the form of an ASR object 250) and one instance of a Natural Language Interpreter 255. The ASR Manager then calls an initialize function on each ILO 240.

Once the ASR Manager 235 creates the ILOs (e.g. 240 and 245), it keeps track of how many ILOs are available for each application, application version, language, and recognizer vendor. Each turn of the dialog with a caller is handled as a separate speech recognition session. A request from the NAP 135 for speech recognition will specify the grammar to use for a given speech recognition session, along with all parameters and data needed to carry out the ASR processing. In turn, the ASR Manager 235 will initiate an object that serves as a FIFO cache for receiving data to be processed. When audio data arrives, the ASR manager 235 feeds the data into the cache object. The ASR Manager 235 then determines which ILO (i.e. ILO 240 or ILO 245) is available to process the data and then connects the cache object to the ILO. If no ILO is available, the cache object is queued to wait for resources when they become available. The ASR Manager 235 then coordinates responses to the ASM 230 on the ESP 150 regarding the behavior of the ILO and/or cache objects. When the ASR Manager 235 gets a result from the ILO 240, it formats the result into a NAP message and returns the result in a response to the ASM 230. If a request to cancel a particular ASR request is received, the ASR Manager 235 closes the cache object and notifies the ILO 240 to abort further processing.

Further, as shown in FIG. 2, messaging system 100 may support multiple MRS such as MRS 167. Similar to MRS 165, MRS 167 is capable of operating various media processing applications. In the example shown, MRS 167 supports Text-To-Speech (TTS) resource 257 having a TTS Manager 260 that cooperates with one or more respective TTS Call Objects 265, TTS Engines 270, and Audio Destination Objects 275. In a preferred embodiment, the TTS engines are preferably Microsoft Speech API (SAPI) compliant, which facilitates interchangeability. One example of such a TTS engine is the Speech Cube available from Elan Informatique, a Lernout & Hauspie company.

Figure 3:
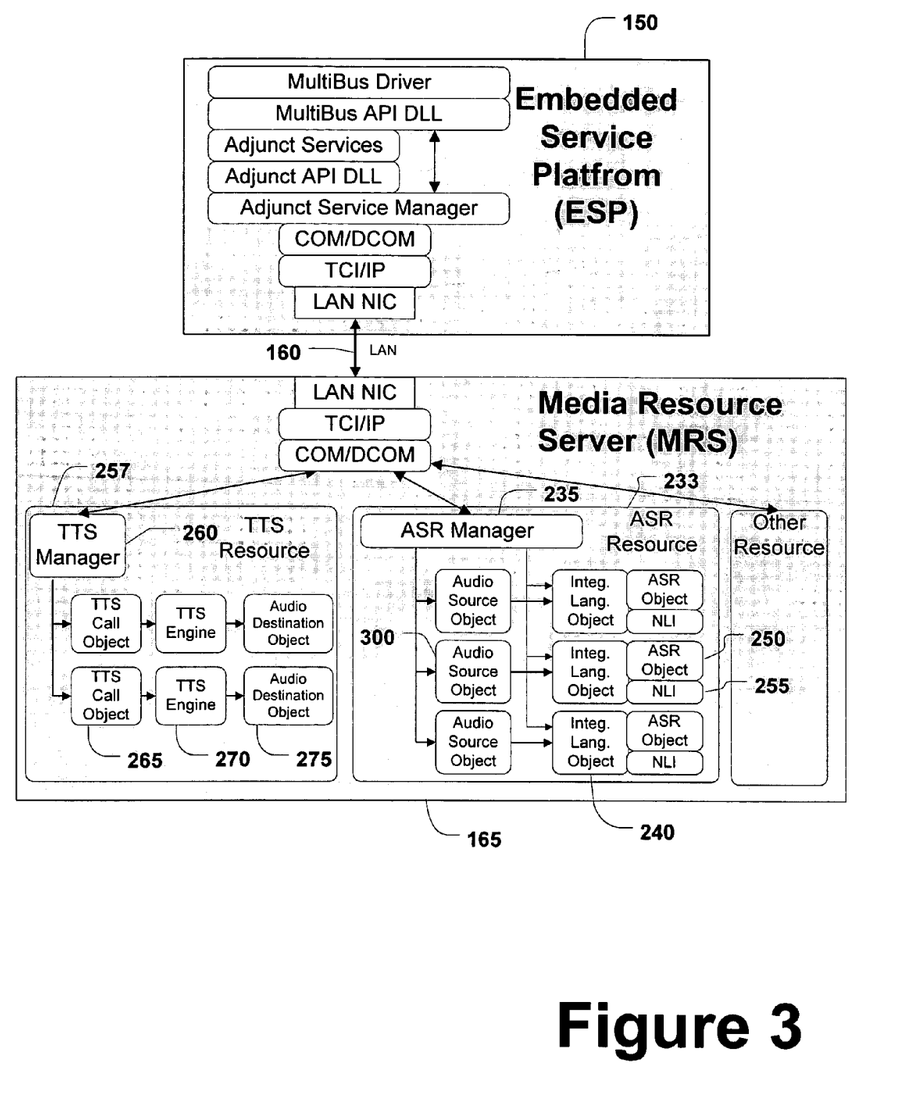
FIG. 3 provides further details of the software components represented in FIG. 2.

FIG. 3 is a block diagram illustrating an expanded software architecture for the ESP 150 and MRS 165 in which additional media resource processing is provided on the MRS 165 in addition to the ASR processing described in FIG. 3. Specifically, as shown, MRS 165 have co-located various media processing resources, such as, text-to-speech conversion (TTS) resource 257. Other resources may also be available. Similar to the ASR resource 233 having an ASR Manager, the TTS resource 257 includes a TTS Manager 260. The TTS Manager 260 is responsible for assigning a request for TTS processing to one or more TTS engines 270 on the MRS. The TTS Manager 260 functions in much the same manager as the ASR Manager 235, handling requests for TTS processing and managing the communication of requests and responses between the TTS engines 270 and the requesting ESP 150.

To manage requests for different types of multi-media processing (e.g., TTS or ASR), the software on the ESP 150 includes an Adjunct Services component. Upon initialization, the Adjunct Services component initializes communications with an adjunct application program interface (Adjunct API) (which is implemented in the form of a Windows NT DLL) that provides a communication interface between the messaging system 135 and the adjunct services or resources on the MRS 165, such as TTS and ASR. The Adjunct Services component serves to route specific classes of media processing requests (e.g., TTS, ASR, etc.) from the Multibus driver to the appropriate media resource manager on the MRS. The Adjunct Services component also provides a means to log information to the NAP for logging and tracing functions.

In operation, the ESP 150 of a NIU 115 will communicate a variety of instructions to the MRS to realize TTS or ASR processing. Included in these instructions are initialization parameters and valuation to initialize a processing session between the NIU 115 and the MRS 165 and 167. This initialization process includes the communication of data indicative of the text or voice to be processed by the MRS 165. Additionally, the NIU 115 communicates a request instruction and data to indicate to the MRS 165 to process the attached data. In the case of TTS processing, the NIU 115 sends initialization parameters and submits requests the MRS 167 to process chunks of data until all of the data has been processed (i.e. has been played back to the subscriber through the telephone network interface of the NIU). Comparatively, when processing ASR, the NIU 115 initializes the MRS 165 to process voice and the MRS 165 submits requests for chunks of voice data for processing until the voice data is deciphered and correlated to a universal messaging application function or all of the voice data has been processed. In the case the voice data is deciphered the resulting function is passed by the MRS 165 to the universal messaging application running on the host computer of the universal messaging system through the ESP 150 of the NIU 115 for execution.

Figure 4:
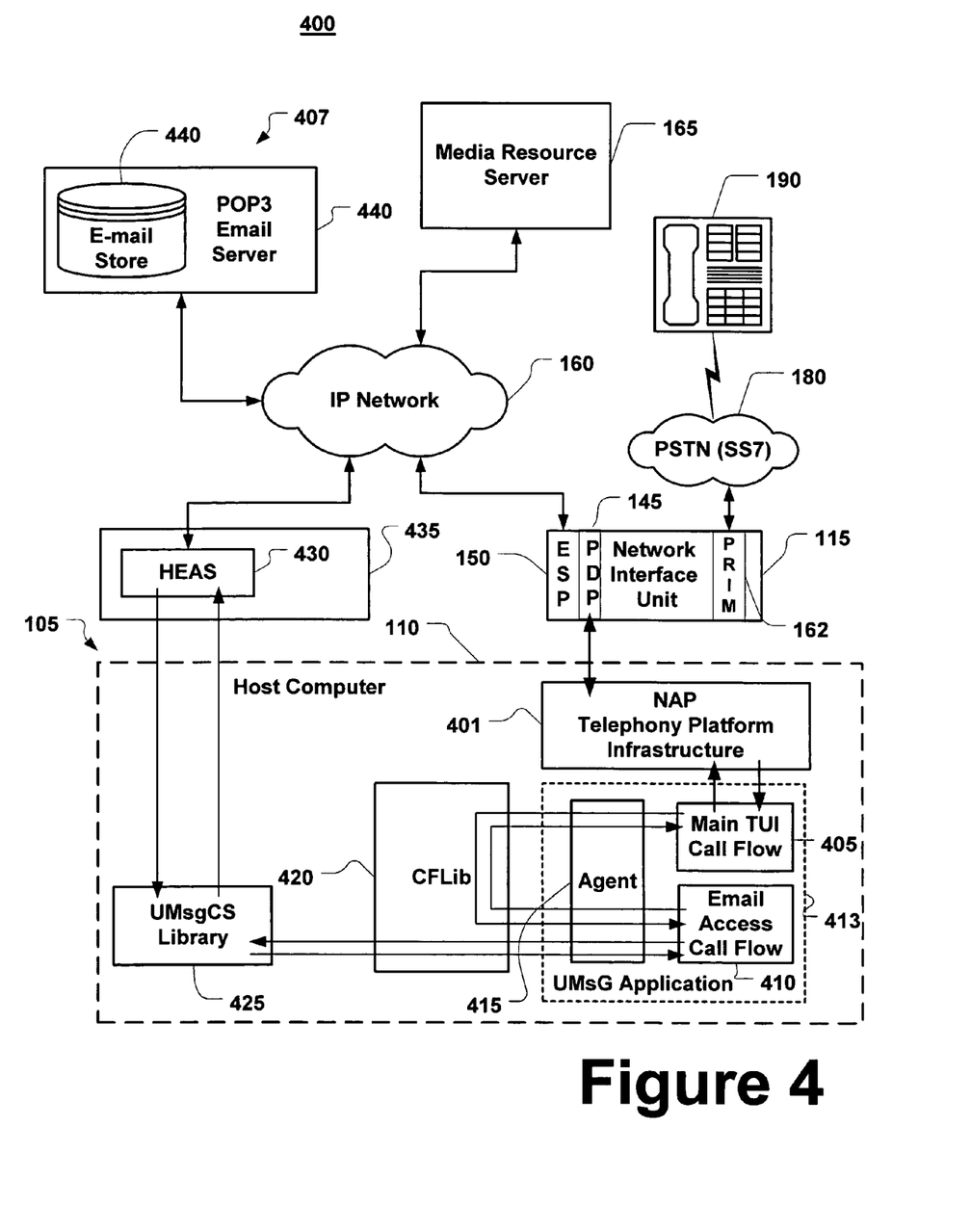
FIG. 4 is a block diagram of an exemplary universal messaging system in accordance with an embodiment of the present invention.

FIG. 4 is a block diagram of an exemplary universal messaging system 200 in which the voice messaging system of FIG. 1 is modified and integrated with an e-mail messaging platform 207. The voice messaging system in FIG. 4 is denoted generally at 105. The universal messaging system 200 is described herein for the purpose of further illustrating the present invention, in particular, the ability to perform text-to-speech processing in such a system.

Referring to the FIG. 4, the universal messaging system 400 comprises a voice messaging platform 105 integrated with an electronic mail messaging platform 407. A network interface unit (NIU) 115 provides a physical connection between the voice messaging platform 105 and the Public Switched Telephone Network (PSTN) 180. One or more servers 435, on which a Handset E-mail Access Service (HEAS) software component 430 executes, assists in the integration between the voice messaging platform 105 and the e-mail messaging platform 407. The HEAS 430 provides access to a subscriber's e-mails managed by an e-mail server 440 of the e-mail messaging platform 407. The voice messaging platform 105 uses the HEAS 430 to provide telephone handset access to e-mails. In the present embodiment, the e-mail server 440 implements the POP3 electronic mail messaging protocol, and the HEAS 430 uses the POP3 protocol to access a subscriber's e-mails, as described more fully below. Additional details concerning the exemplary universal messaging system 400 are provided in co-pending, commonly assigned, patent application Ser. No. 09/636,668, filed herewith, entitled "Coordination of a Telephony Handset Session with an E-mail Session in a Universal Messaging System".

In the present embodiment, the voice messaging platform comprises the Unisys Network Applications Platform (NAP) 401. As mentioned above, the NAP 401 provides data and voice processing capabilities through network applications running on a host computer system 110. In the exemplary system 400, a Universal Messaging application 413 (hereinafter "Universal Messaging Application" or "UMsg Application") executes on the NAP 401 and provides universal messaging services to subscribers of the voice messaging system 105.

A network application, like the Universal Messaging Application 413, comprises one or more call flows that determine the functionality of the application. A call flow defines how a call is processed by the application from the time it is connected until it is disconnected. It determines how a network application will react to various telephony-related events. In particular, a call flow specifies each function or processing step to be executed during a telephone call, the possible results for each function, the decision path to be followed based on the result, and each prompt or voice message to be played during the course of the telephone call.

A call flow is comprised of a sequence of call states. As used herein, the phrase "to play a prompt" and variations thereof means to output the digitized voice of a prompt over a telephone connection or the like so that it can be heard by a caller. A call state is one state, or point, in a call flow. At any given time, each call coming into a network application has a finite call state. At a given call state, a given function is performed and the results of the function point either to a next state, or to an exit state. The function can lead to one or many results.

On the NAP 401, a call flow can execute two kinds of functions—core functions and custom functions. Core functions are pre-coded functions provided with the NAP 401. These functions provide basic telephony services such as initiating a call, playing a voice prompt, collecting digits, and the like. Custom functions are application-specific functions that the application developer creates to perform functions not available using the core functions. For example, the application may require the retrieval of information from an application-specific database. Custom functions can be written in any programming language that the underlying computer system 22 (e.g. UNISYS A Series or ClearPath HMP NX) on which the NAP 401 is implemented can execute, such as, for example, LINC, ALGOL, COBOL, C or the like.

A network application executes in a runtime environment on the NAP 401. Multiple network applications can be installed and run on a single NAP 401, with each network application running in its own runtime environment. The runtime environment for a given network application includes a core function library that contains the executable code for each core function, and a custom function library that contains the executable code for each custom function written for the network application. Another library may be provided for custom functions written in the LINC programming language.

A primary component of the runtime environment is called the Agent. The Agent is a software component that (i) performs and controls call flow execution (the next function to be executed is based on the result of the previous function), (ii) passes parameters to various functions, (iii) translates new dialog activity into call states, (iv) saves information from NAP responses for use during call flow execution, and (v) enters call flow information into memory-based state tables. Execution of a call flow by the Agent is interpretive; the Agent interprets a representation of the call flow contained in a CALLFLOWS file. At each call state, the Agent invokes the specified core function or custom function from the appropriate library.

Referring still to FIG. 4, the UMsg Application 413 executing on the NAP 401 comprises a set of Main Telephony User Interface (TUI) Call Flows 405 and a second set of E-mail Access Call Flows 410. Hereinafter, the terms "Main TUI Call Flows 405" and "E-mail Access Call Flows 410" may be used in the singular, when referring to one call flow of the respective set, or in the plural, when referring to the collection of call flows of the respective set, as the case may require. When the Universal Messaging Application 413 is installed on the NAP 401, the NAP 401 initiates an Agent 415 for the UMsg Application 413.

A Universal Messaging Client Services library software component (hereinafter "UMsgCS Library") 425, which comprises a set of executable software routines that execute on the host computer 115, interfaces the host computer system 110 and NAP 401 to the HEAS 430. The UMsgCS Library 425 communicates with the HEAS 430 using a sockets protocol and is responsible for socket management. The UMsgCS Library 425 also performs data translation between the host computer system 110 and the NT server 435.

A Call Flow Library 420 is used to create client-server relationships among the sets of call flows 405 and 410 of the UMsg Application 413 and the UMsgCS Library 425. The UMsgCS Library 425 serves as a server to the set of Email Access Call Flows 410 of the UMsg Application 413. The E-mail Access Call Flows 410, in addition to serving as a client of the UMsgCS Library 425, also serve as a server to the Main TUI Call Flows 405 of the UMsg Application 413. Thus, the E-mail Access Call Flows 410 serve a dual role as both a client and a server.

As described in co-pending application Ser. No. 09/636, 668, the UMsg Application 413, the UMsgCS Library 425, and the HEAS 430, work together to coordinate a telephony session (i.e., a call from a subscriber's telephone handset 190 into the NAP 401) with a corresponding e-mail session on the e-mail server 440 that is established in response to a request by the subscriber for access from the telephone handset 190 to the subscriber's e-mail inbox on the server 440. Through the use of various state tables, these components maintain an association between the telephony session and the e-mail session. As described more fully in the co-pending application, the Main TUI Call Flow 405 of the UMsg Application 413 will, on behalf of the subscriber, request via the UMsgCS Library 425 that the HEAS 430 logon to the subscriber's account on the e-mail server 440 and obtain information concerning the number of e-mail messages in the subscriber's e-mail inbox, as well as the text of at least the header fields of each e-mail message (To:, From:, Subject:, etc.). The UMsg Application 413 maintains a table for each telephony session that stores in appropriate fields of the table, the IP Address of the server 435 that hosts the HEAS 430 that is managing the corresponding e-mail session for the subscriber, a HEAS Session Index that is used by the HEAS 430 to identify the subscriber's session with the e-mail server 440, and an e-mail ID that identifies a particular e-mail message in the subscriber's inbox on the e-mail server 440. As described hereinafter, this information is used whenever a subscriber subsequently chooses to have the body of that particular e-mail message converted from text-to-speech and played back to the subscriber over the telephone handset 190.

Figure 5:
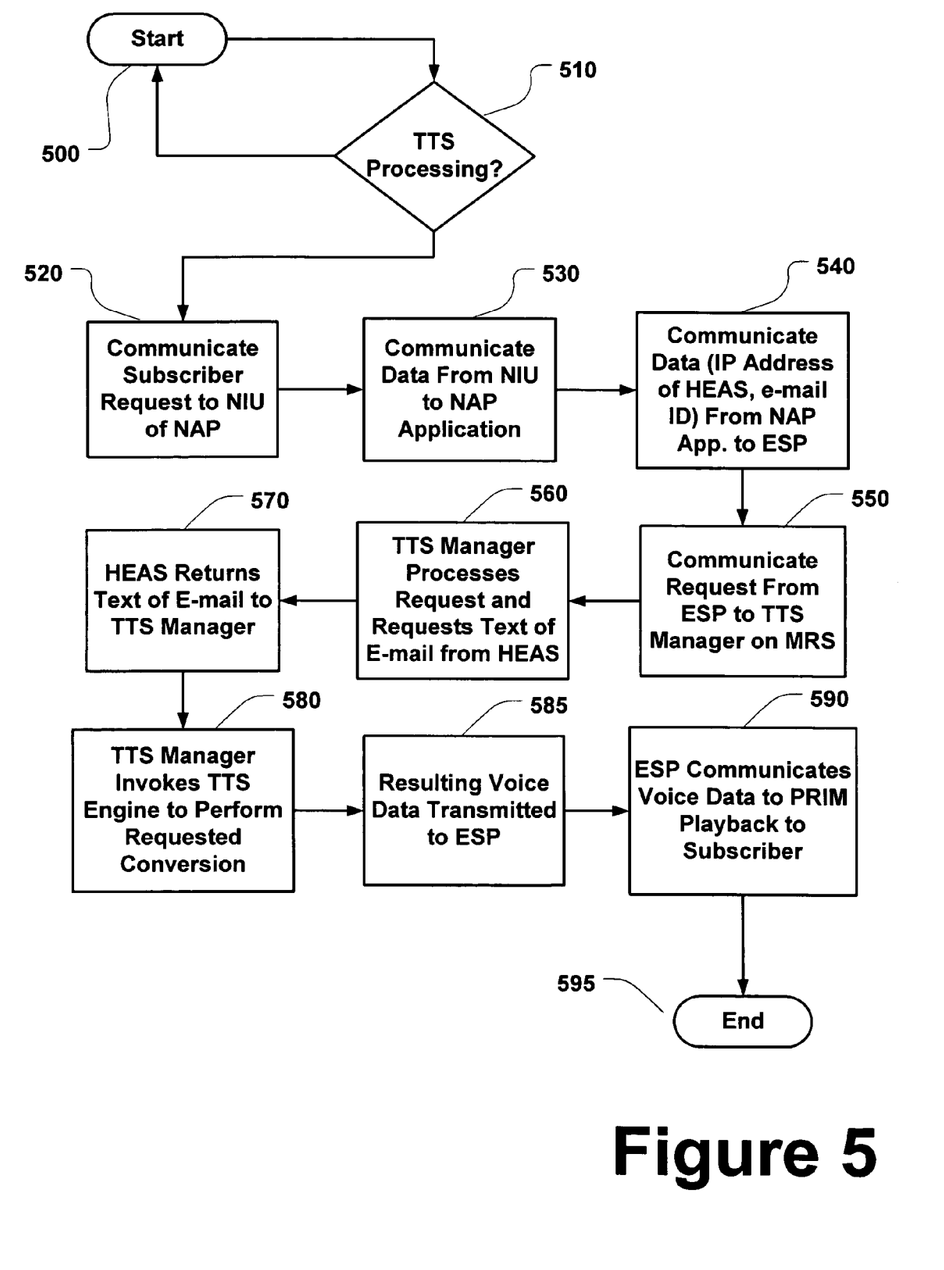
FIG. 5 is a flowchart of the processing performed by the universal messaging system when processing a request for Text-To-Speech (TTS) conversion in accordance with present invention.

Text-to-speech processing of the body text of an e-mail is illustrated in the flow diagram of FIG. 5. As shown, processing begins at block 500 and proceeds to block 510 where a check is performed to determined if a subscriber has made a request to have the text of a particular e-mail message converted to speech by, for example, pressing a particular key on the telephone handset 190 that corresponds to a menu choice for such a feature (e.g., "Press 4 to hear the text of the current e-mail message"). If a request has not been made, processing reverts to block 500. However, if the alternative proves to be true, processing proceeds to block 520 where the DTMF digit for that selection is passed from the PRIM 162 of the NIU 115 to the PDP 145 and on to the NAP 201. The NAP 201 passes the received data at block 530 to the UMsg Application, which recognizes the selection as a request to have the text of the body of the current e-mail message converted to speech and then played back to the subscriber. In response to the request, the UMsg Application 213 sends a corresponding request via the NAP 201 to the ESP 150 at block 540. As part of the request, the UMsg Application 213 passes the IP Address of the HEAS server 235, the HEAS Session Index for the subscriber's e-mail session on the HEAS 230, and the e-mail ID of the message to be converted from text-to-speech. The ESP 150 then forwards a corresponding request to the TTS Manager on the MRS 165 at block 550. At block 560, the TTS Manager on the MRS 165 then makes a request to the HEAS 230, via network 160, to obtain the text of the requested e-mail. The HEAS 230 returns the requested text to the TTS Manager on the MRS 165 at block 570. The TTS Manager on the MRS

165 then invokes the services of a TTS engine on the MRS 165 to perform the requested conversion at block 580. The resulting voice data is then transmitted to the ESP 150 as a response to the request at block 585. The ESP 150 then causes the voice data to be transmitted to the requesting subscriber via PDP 145, then to PRIM 162 at block 590. The subscriber can now hear a reading of the text of the message on the telephone handset 190. Processing then terminates at block 595. Note that the TTS processing of the e-mail text and the playback of the resulting voice data to the subscriber are completely offloaded from the NAP 201, resulting in improved processing efficiency and faster response times for the subscriber. In addition, this architecture allows commercially available media resource engines (e.g. TTS, ASR, NLU) to be used without any accommodation for the native TSP environment.

In a preferred embodiment, rather than having the entire body text of an e-mail message converted form text to speech and played back to the subscriber, the subscriber may only request that the short text segments in the header of the message (e.g., To:, From:, Subject:, etc.) be played back. In this case, the UMsg Application 213 may have cached those portions of a message (but not the body text). In response to a request to have these shorter text segments converted to speech, the UMsg Application 213 may forward the text to the ESP 150 with the request, thereby eliminating the requirement of the MRS to request those segments from the HEAS 230. In this embodiment, therefore, the MRS 165 need only access the HEAS 230 when a request for playback of the body text of a message is made.

At least portions of the present invention may be embodied in the form of program code (i.e., instructions) stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer, the machine becomes an apparatus for practicing the invention. The present invention may also be embodied in the form of program code that is transmitted over some transmission medium, such as over electrical wiring or cabling, through fiber optics, over a network, including the Internet or an intranet, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

In sum, the present invention provides a system and methods that allow messaging systems to adapt to and efficiently perform a variety of multi-media processing functions. It is understood that changes may be made to the embodiments described above without departing from the broad inventive concepts thereof. Accordingly, the present invention is not limited to the particular embodiments disclosed, but is intended to cover all modifications that are within the spirit and scope of the invention as defined by the appended claims.

What is claimed is:

1. A messaging system comprising:
    a voice messaging platform for receiving, processing, and storing voice messages;
    at least one network interface unit (NIU) having a first interface to the voice messaging platform for communicating between said NIU and said voice messaging platform and a second interface to a telephone network for receiving calls from said telephone network;
    at least one embedded services platform (ESP), comprising a computer with a network interface that supports an IP protocol for communicating between said ESP and a network external to said messaging system, wherein said ESP is operatively coupled to said first and second interfaces of said NIU, and wherein said ESP executes multimedia processes; and
    at least one media resource server connected to said ESP via the network interface of said ESP, the ESP offloading selected multi-media processing functions to said media resource server.

2. The messaging system recited in claim 1, wherein the multi-media processing functions offloaded to the media resource server comprise at least one of Text-to-Speech (TTS) conversion, Automatic Speech Recognition (ASR), and Natural Language Understanding (NLU).

3. The messaging system recited in claim 1, wherein said ESP comprises software application components that facilitate the communication of data between said ESP and said media resource servers, said software application components capable of cooperating with an operating system of said ESP.

4. The messaging system recited in claim 3, wherein said software application components comprise a TCP/IP communication stack cooperating with a LAN network interface card, said software application capable of supporting COM/DCOM type data communication.

5. The messaging system recited in claim 1, wherein said first interface cooperates with said voice messaging platform by communicating data using a Small Computer Systems Interface (SCSI) communication protocol.

6. The messaging system recited in claim 1, wherein said second interface cooperates with said telephone network by communicating data using an E1/T1 communication protocol.

7. The messaging system recited in claim 2, wherein said media resource server employs Text-To-Speech (TTS) software to realize said TTS conversion processing function, said TTS software comprising: at least one TTS manager, at least one TTS Call Object, at least one TTS Engine, and at least one Audio Destination Object, said TTS manager distributing processing among available TTS Call Objects to communicate text data to an available TTS Engine for processing of data from text to speech, said TTS Engine communicating speech data to said Audio Destination Object for delivery to said ESP of said messaging system.

8. The messaging system recited in claim 2, wherein said media resources server employs Automatic Speech Recognition (ASR) software to realize said ASR processing function, said ASR software comprising: at least one ASR Manager and one Integrated Language Object (ILO), said ILO comprising at least one ASR Object and at least one speech synthesizer, such that voice data may be communicated to said ASR Manager, said ASR Manager distributing the processing of said voice data to said available ILO, said ILO processing said voice data using said ASR Object and said speech synthesizer to provide processed voice data, said processed voice data being communicated to said ESP via said ASR Manager.

9. The messaging system recited in claim 1, wherein the messaging system is a universal messaging system and further comprises an e-mail messaging platform interfaced to the voice messaging platform for receiving, processing, and storing e-mail messages.

10. The messaging system recited in claim 9, wherein the multi-media processing functions offloaded to the media resource server comprise at least one of Text-to-Speech (TTS) conversion, Automatic Speech Recognition (ASR), and Natural Language Understanding (NLU).

11. A method comprising:
providing a voice messaging platform for receiving, processing, and storing voice messages;
providing at least one network interface with (NIU) having a first interface to the voice messaging platform for communicating between said NIU and said voice messaging platform and a second interface to a telephone network for receiving calls from said telephone network;
providing at least one embedded services platform (ESP), comprising a computer with a processor, a memory, an operating system, and a network interface that supports an IP protocol for communicating between said ESP and a network external to said messaging system, wherein said ESP is operatively coupled to said first and second interfaces of said NIU, wherein said ESP is insertable into a housing containing another computer, and wherein said ESP executes multimedia processes; and
providing at least one media resource server connected to said ESP via the network interface of said ESP, the ESP offloading selected multi-media processing functions to said media resource server.

12. The method recited in claim 11, wherein said providing at least one media resources server comprises providing media applications operating on said media resources server capable of processing media functions comprising at least one of: Text-to-Speech (TTS) conversion, Automatic Speech Recognition (ASR) and Natural Language Understanding (NLU).

13. The method recited in claim 12, wherein said processing media function for TTS conversion processing further comprises the steps of:
communicating text data by said ESP to at least one TTS Manager;
accepting data by said TTS Manager for distribution to available TTS Objects;
conveying said text data by said available TTS Call Objects to available TTS engines;
processing said text data to speech data by said TTS engines to produce processed speech data for communication to available Audio Destination objects; and
providing said processed speech data to said messaging system by said Audio Destination objects.

14. The method recited in claim 12, wherein said processing media functions for ASR further comprises the steps of:
communicating voice data by said ESP to at least one ASR Manager;
accepting data by said ASR Manager for distribution to available Integrated Language Objects (ILO), said ILO comprising ASR Objects that communicate said speech data to at least one speech synthesizer;
processing said speech data by said speech synthesizer to produce instruction data for said host computer of said messaging system; and
delivering said instruction data to said host computer of said messaging system.

15. A method for multi-media processing in a messaging system, wherein the messaging system comprises a voice messaging platform for receiving, processing, and storing voice messages on a host computer, at least one network interface unit (NIU) having a first interface to the voice messaging platform for communicating between the NIU and the voice messaging platform and a second interface to a telephone network for receiving calls from the telephone network, at least one embedded services platform (ESP) operatively coupled to the first and second interfaces of the NIU and having a network interface that supports an IP protocol for communicating between the ESP and a network external to the messaging system, the ESP capable of executing multimedia processes and at least one media resource server connected to the ESP via the network interface of the ESP, the method comprising:
receiving at the ESP a request for media processing, wherein said ESP comprises a computer and a network interface that supports an IP protocol for communicating between said ESP and a network external to said messaging system, wherein said ESP is operatively coupled to said first and second interfaces of said NIU, and wherein said ESP executes multimedia processes;
communicating the request from the ESP to the at least one media resource server via the network interface of the ESP, the media resource server processing the request and communicating resulting data to the ESP via the network interface; and
communicating the resulting data from the ESP to one of the first and second interfaces of the NIU.

16. The method recited in claim 15, wherein the request for media processing comprises a request for one of Text-to-Speech (TTS) conversion, Automatic Speech Recognition (ASR), and Natural Language Understanding (NLU).

17. The method recited in claim 15, wherein the request for media processing comprises a request for Text-to-Speech (TTS) conversion of selected text data, and wherein said step of communicating the request from the ESP to the media resource server comprises communicating the selected text data from the ESP to at least one TTS Manager on the media resource server, the TTS Manager distributing the selected text data to an available TTS engine on the media resource server which converts the selected text data to resulting speech data.

18. The method recited in claim 17, further comprising receiving the resulting speech data at the ESP via the network interface and transmitting the resulting speech data directly from the ESP to a telephone handset of a caller connected to the telephone network via the second interface of the ESP.

19. The method recited in claim 15, wherein the request for media processing comprises a request for Automated Speech Recognition (ASR) of selected speech data, and wherein said step of communicating the request from the ESP to the media resource server comprises communicating the selected speech data from the ESP to at least one ASR Manager on the media resource server, the at least one ASR Manager distributing the selected speech data to an available ASR engine on the media resource server which processes the speech data and outputs resulting data representative of a recognition of the selected speech data.

20. The method recited in claim 19, further comprising receiving the resulting data at the ESP via the network interface and transmitting the resulting data directly to the voice messaging platform via the first interface of the ESP.

21. The method recited in claim 15, wherein the request for media processing comprises a request for Natural Language Understanding (NLU) of selected speech data, and wherein said step of communicating the request from the ESP to the media resource server comprises communicating the selected speech data from the ESP to at least one ASR Manager on the media resource server, the at least one ASR Manager distributing the selected speech data to an available ASR engine on the media resource server which processes the speech data and outputs data representative of a recognition of the selected speech data, the media resource server then further processing the data in accordance with a Natural Language Understanding operation to produce resulting data representative of a natural language understanding of the selected speech data.

22. The method recited in claim 21, further comprising receiving the resulting data at the ESP via the network interface and transmitting the resulting data directly to the voice messaging platform via the first interface of the ESP.

23. A method for multi-media processing in a universal messaging system, wherein the messaging system comprises a voice messaging platform for receiving, processing, and storing voice messages on a host computer, an e-mail messaging platform for receiving, processing, and storing e-mail messages and being interfaced to the voice messaging platform, at least one network interface unit (NIU) having a first interface to the voice messaging platform for communicating between the NIU and the voice messaging platform and a second interface to a telephone network for receiving calls from the telephone network, at least one embedded services platform (ESP), comprising a single board computer with a processor, a memory, an operating system, and a network interface that supports an IP protocol for communicating between said ESP and a network external to said messaging system, wherein said ESP is operatively coupled to the first and second interfaces of the NIU and is capable of executing multimedia processes, and at least one media resource server attached to the external network, the e-mail messaging platform also being connected to the external network and having a unique network address thereon, the method comprising:

receiving at the voice messaging platform, via the NIU, from a subscriber of the universal messaging system connected to the telephone network via a telephone handset, a request for the audio playback of an e-mail message received by the e-mail messaging platform for the subscriber;

communicating the request from the voice messaging platform to the ESP together with the network address of the e-mail messaging platform and information identifying the e-mail message to be played back to the subscriber;

communicating the request, the network address of the e-mail messaging platform, and the identifying information to the media resource server, the media resource server using the network address of the c-mail platform and the identifying information to retrieve the text of the e-mail message from the e-mail messaging platform, converting the received text to speech data, and transmitting the speech data to the ESP; and transmitting the speech data directly from the ESP to the telephone handset of the subscriber via the second interface of the ESP and the telephone network.

24. The method recited in claim 23, wherein said step of communicating the request from the ESP to the media resource server comprises communicating the request, the network address of the e-mail message platform, and the identifying information to a TTS Manager on the media resource server, the TTS Manager using the network address of the e-mail messaging platform and the identifying information to retrieve the text of the e-mail message and to distribute the text to an available TTS engine for conversion of the text to speech, the media resource server then transmitting the resulting speech data to the ESP.

* * * * *

UNITED STATES PATENT AND TRADEMARK OFFICE
CERTIFICATE OF CORRECTION

PATENT NO. : 7,327,832 B1 Page 1 of 1
APPLICATION NO. : 09/636677
DATED : February 5, 2008
INVENTOR(S) : Gary P. Russell et al.

It is certified that error appears in the above-identified patent and that said Letters Patent is hereby corrected as shown below:

Column 16, line 15: "c-mail" should be --e-mail--.

Signed and Sealed this

Twenty-fifth Day of March, 2008

JON W. DUDAS
*Director of the United States Patent and Trademark Office*